(12) United States Patent
Gou

(10) Patent No.: US 10,397,459 B2
(45) Date of Patent: Aug. 27, 2019

(54) AUTONOMOUS INTELLIGENT VEHICLE

(71) Applicant: HON HAI PRECISION INDUSTRY CO., LTD., New Taipei (TW)

(72) Inventor: Tai-Ming Gou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 53 days.

(21) Appl. No.: 15/885,913

(22) Filed: Feb. 1, 2018

(65) Prior Publication Data

US 2019/0116302 A1 Apr. 18, 2019

Related U.S. Application Data

(60) Provisional application No. 62/573,773, filed on Oct. 18, 2017.

(51) Int. Cl.
| | |
|---|---|
| *G05D 1/00* | (2006.01) |
| *H04N 5/225* | (2006.01) |
| *G05D 1/02* | (2006.01) |
| *B60Q 1/00* | (2006.01) |
| *H04N 7/18* | (2006.01) |
| *H04N 5/33* | (2006.01) |
| *H04N 5/232* | (2006.01) |
| *G06K 9/00* | (2006.01) |

(52) U.S. Cl.
CPC ......... *H04N 5/2256* (2013.01); *B60Q 1/0023* (2013.01); *B60Q 1/0041* (2013.01); *G05D 1/0088* (2013.01); *G05D 1/0248* (2013.01); *G05D 1/0251* (2013.01); *G06K 9/00798* (2013.01); *H04N 5/23203* (2013.01); *H04N 5/23296* (2013.01); *H04N 5/33* (2013.01); *H04N 7/183* (2013.01)

(58) Field of Classification Search
CPC ............. H04N 5/2256; H04N 5/23203; H04N 5/23296; H04N 5/33; H04N 7/183; B60Q 1/0041; B60Q 1/0023; G06K 9/00798; G05D 1/0248; G05D 1/0251; G05D 1/0088

See application file for complete search history.

(56) References Cited

U.S. PATENT DOCUMENTS

| 7,124,008 B2 * | 10/2006 | Brun ........................ B60Q 1/10 701/49 |
| 2014/0042325 A1 * | 2/2014 | Yamamura ........... B60Q 1/0023 250/347 |
| 2014/0350836 A1 * | 11/2014 | Stettner ................. G01S 17/023 701/301 |
| 2017/0067609 A1 * | 3/2017 | Ichikawa ............. B60Q 1/0041 |

(Continued)

FOREIGN PATENT DOCUMENTS

JP 4557537 7/2010

*Primary Examiner* — Howard D Brown, Jr.
(74) *Attorney, Agent, or Firm* — ScienBiziP, P.C.

(57) ABSTRACT

This disclosure relates to an autonomous intelligent vehicle, including: a vehicle body and two eye lamps located in the front of the vehicle body and spaced apart from each other, wherein the eye lamp comprises a light emitting device and image acquiring device spaced apart from the light emitting device; the light emitting device is used to emit light to light the object in front of the vehicle, the image acquiring device is used to acquire and process the image of the object, and send the processed result to the advanced driver assistance system.

20 Claims, 12 Drawing Sheets

(56) References Cited

U.S. PATENT DOCUMENTS

2017/0261982 A1* 9/2017 Otaki .................... B60W 40/09
2018/0264990 A1* 9/2018 Mouri .................... F21S 41/13
2018/0288848 A1* 10/2018 Gao .................. H05B 33/0848

* cited by examiner

AUTONOMOUS INTELLIGENT VEHICLE

CROSS-REFERENCE TO RELATED APPLICATIONS

This application claims the benefit under 35 U.S.C. § 119(c) of U.S. Provisional Application No. 62/573,773 filed Oct. 18, 2017, the disclosure of which is incorporated by reference herein.

BACKGROUND

1. Technical Field

The present disclosure relates to autonomous driving technology, especially, relates to an autonomous intelligent vehicle.

2. Description of Related Art

As the development of the artificial intelligence technology, there are more and more the intelligent vehicle technology with a goal of no driver.

Traditional vehicle lamps, as the eyes of the intelligent vehicle, are only used for lighting and cannot observe the environment, and also send the observed information to the advanced driver assistance system (ADAS), so that the advanced driver assistance system can make a judgement according to the algorithm.

In traditional advanced driver assistance system, the image data in front of the intelligent vehicle is obtained by the light detection and ranging (LiDAR) system. Because the LiDAR system forms an image of an object through the reflected laser, the LiDAR system requires a plurality of laser light sources, that cause a larger volume, a grater power and higher cost.

What is needed, therefore, is to provide an autonomous intelligent vehicle that can overcome the problems as discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
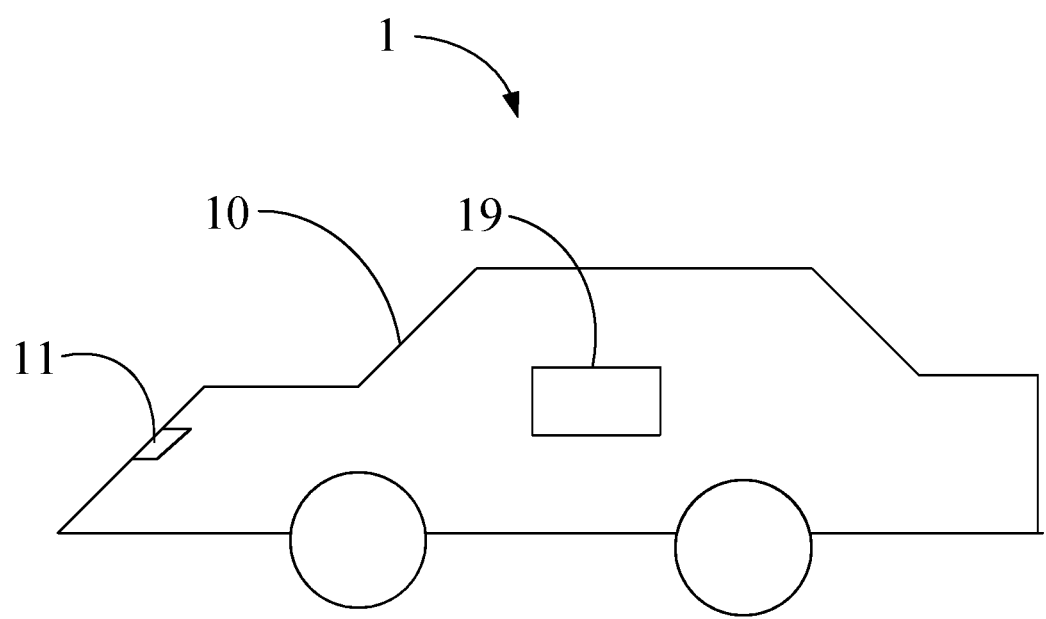
FIG. 1 is a side schematic diagram of one embodiment of an autonomous intelligent vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to considered as limiting the scope of the embodiments described herein.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

References will now be made to the drawings to describe, in detail, various embodiments of the present autonomous intelligent vehicles.

Figure 2:
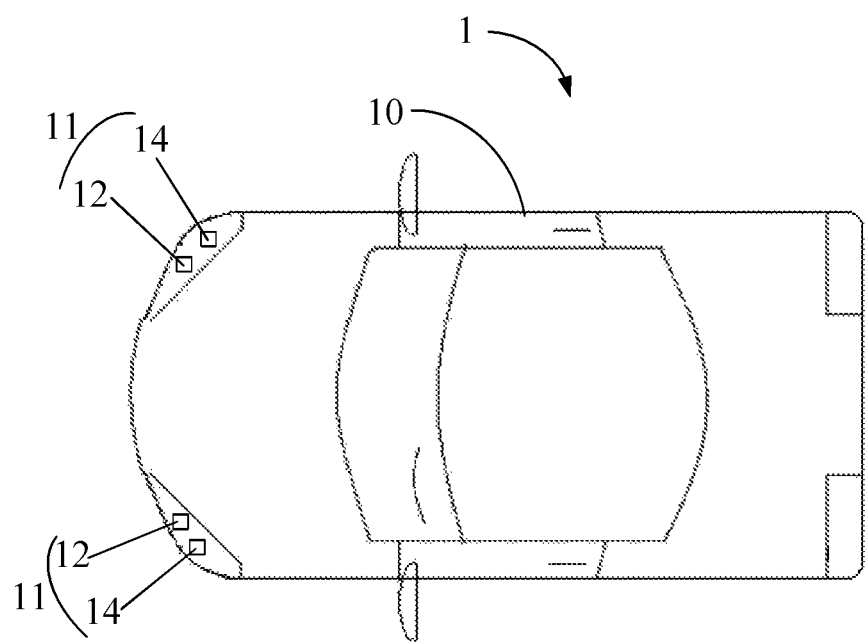
FIG. 2 is a top schematic diagram of the autonomous intelligent vehicle of FIG. 1.

Referring to FIGS. 1-2, an autonomous intelligent vehicle 1 of one embodiment is provided and includes a vehicle body 10, an advanced driver assistance system 19 located in vehicle body 10, and two eye lamps 11 located in the front of the vehicle body 10 and spaced apart from each other. The location of the two eye lamps 11 are the same as the location of the two eye lamps of the traditional vehicle. The two eye lamps 11 are respectively connected to and controlled by the advanced driver assistance system 19. In one embodiment, one of the two eye lamps 11 is located on the left front, and the other one is located on the right front.

The eye lamp 11 includes a light emitting device 12 and an image acquiring device 14 spaced apart from the light emitting device 12. The light emitting device 12 emits light to light the object in front of the vehicle body 10. The image acquiring device 14 acquires and processes the image of the object, and sends the processed result to the advanced driver assistance system 19.

Figure 3:
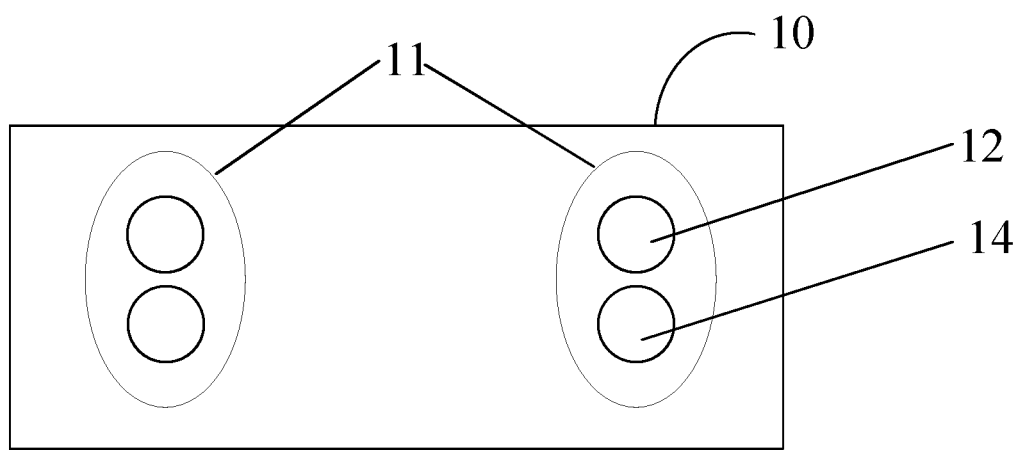
FIG. 3 is a schematic diagram of one embodiment of eye lamps of the autonomous intelligent vehicle of FIG. 1.
Figure 4:
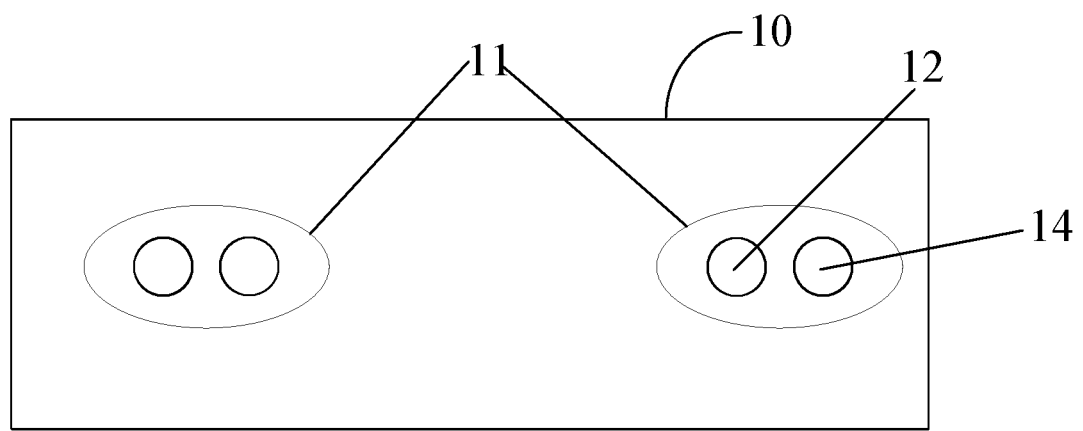
FIG. 4 is a schematic diagram of another embodiment of eye lamps of the autonomous intelligent vehicle of FIG. 1.

The light emitting device 12 and the image acquiring device 14 are located in a lamp shade. The location of the light emitting device 12 and the image acquiring device 14 is not limited and can be designed as needed. Referring to FIG. 3, the light emitting device 12 can be located above or under the image acquiring device 14. Referring to FIG. 4, the light emitting device 12 can be located on left or right of the image acquiring device 14. In one embodiment, the light emitting device 12 and the image acquiring device 14 are located at the same level, two light emitting devices 12 are located inside and two image acquiring devices 14 are located outside.

Figure 5:
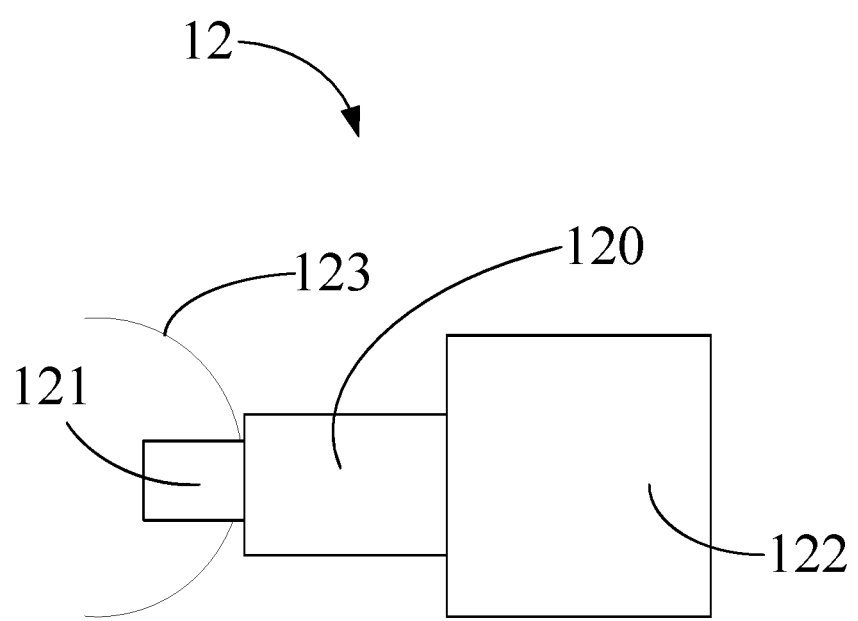
FIG. 5 is a schematic diagram of one embodiment of a light emitting device of the autonomous intelligent vehicle of FIG. 1.

Referring to FIG. 5, the light emitting device 12 includes a heat sink 120, a light emitting diode 121, and a reflective concave mirror 123. The light emitting diode 121 is located on a surface of the heat sink 120 and at the bottom of the reflective concave mirror 123. In one embodiment, the reflective concave mirror 123 defines a through hole at the bottom. The heat sink 120 is located on the outside of the reflective concave mirror 123 and covers the through hole. The light emitting diode 121 is in direct contact with the heat sink 120 by passing through the through hole of the reflective concave mirror 123. In one embodiment, the reflective concave mirror 123 is fixed on the heat sink 120 so that they can be moved or rotated together.

Furthermore, the light emitting device 12 can also includes a controller 122. The controller 122 is connected to the heat sink 120 and the light emitting diode 121. The controller 122 controls the work of the light emitting diode 121 and adjusts the emitting light angle of the light emitting diode 121. Thus, the lighting angle of the two eye lamps 11 is variable.

The light emitting diode 121 can be a laser diode or an ordinary light emitting diode. The light emitting diode 121 can emit laser or ordinary light. The light emitted from the light emitting device 12 can be infrared light, visible light, or light with other wavelengths, such as the light with a central wavelength of 850 nanometers, 870 nanometers, 890 nanometers, 905 nanometers, or 940 nanometers.

The light emitting device 12 can includes a plurality of light emitting units for emitting light with different wavelengths. In one embodiment, a visible light can be emitted in day, and an infrared light can be emitted in night. In one embodiment, both ordinary light for lighting and acquiring image and later for detecting distance can be simultaneously emitted. In one embodiment, the light emitting device 12 can include a large power laser diode for high beam and a conventional laser diode or an ordinary light emitting diode for low beam.

Figure 6:
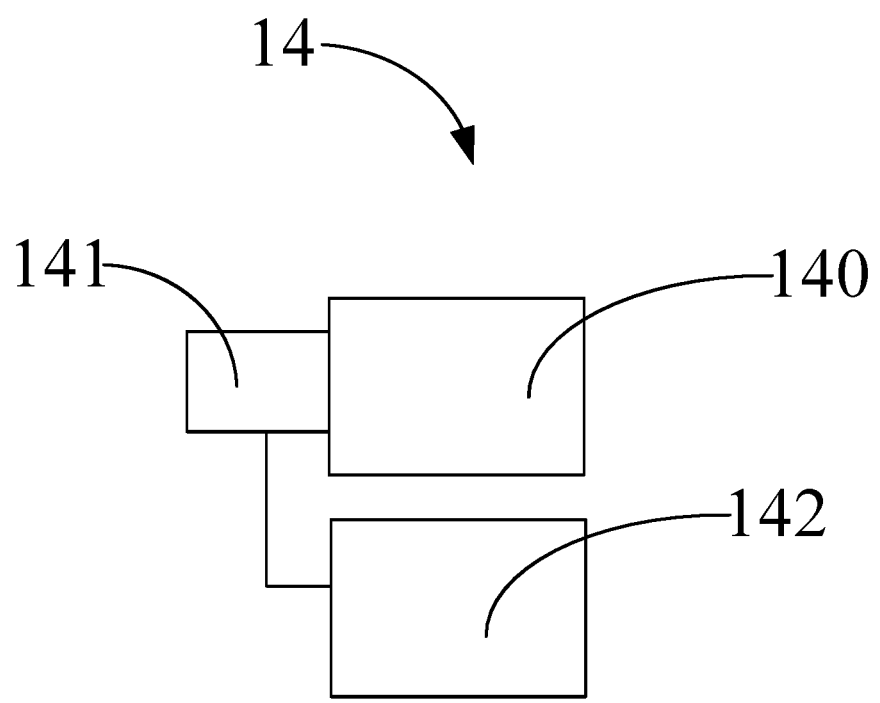
FIG. 6 is a schematic diagram of one embodiment of an image acquiring device of the autonomous intelligent vehicle of FIG. 1.

Referring to FIG. 6, the image acquiring device 14 includes an optical sensor 141 and an image processor 142 connected to the optical sensor 141. The optical sensor 141 can be a charge-coupled device (CCD) camera, infrared complementary metal oxide semiconductor (CMOS) laser displacement sensor, color CMOS laser displacement sensor, or any combination thereof. In one embodiment, the optical sensor 141 includes two infrared CMOS laser displacement sensors and a color CMOS laser displacement sensor. The optical sensor 141 acquires image. The image processor 142 identifies and analysis the image, and send the result to the advanced driver assistance system 19. The image processor 142 is a micro computer loaded with image processing software. Furthermore, the image acquiring device 14 includes an adjusting device 140. The optical sensor 141 is fixed on the adjusting device 140. The visual angle of the optical sensor 141 can be changed by the adjusting device 140. Thus, larger view can be obtained.

In one embodiment, the two eye lamps 11 respectively includes independent image processors 142, independently acquires and process images, and independently sends the result to the advanced driver assistance system 19.

In another embodiment, the two eye lamps 11 shares the same one image processor 142, independently acquires images, and processes the images by the stereo system of the common image processor 142, and sends the result to the advanced driver assistance system 19.

Because the autonomous intelligent vehicle 1 directly acquires image by the two eye lamps 11, that is different from the LiDAR system which image through the time of the reflected laser, the light emitting device 12 can use small-sized laser diode, that cause low cost. Furthermore, the beam angle of the laser diode is adjustable and the visual angle of the two eye lamps 11 is increased.

Figure 7:
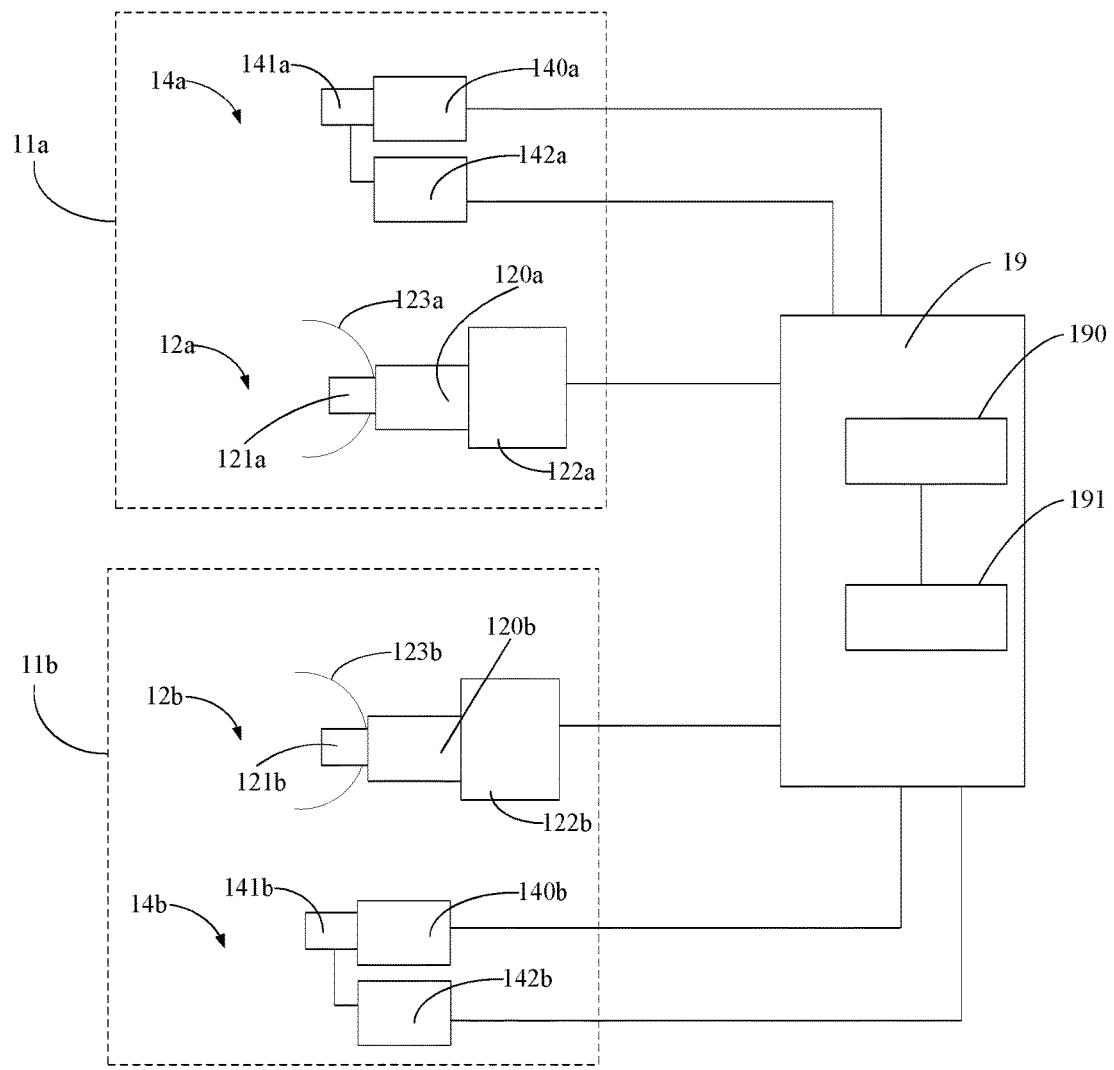
FIG. 7 shows a connection relationship of the one embodiment between two eye lamps and the advanced driver assistance system.

Referring to FIG. 7, in one embodiment, the autonomous intelligent vehicle 1 includes a left eye lamp 11a and a right eye lamp 11b. The left eye lamp 11a includes a first light emitting device 12a and a first image acquiring device 14a. The first light emitting device 12a includes a first heat sink 120a, a first light emitting diode 121a, a first controller 122a, and a first reflective concave mirror 123a. The first image acquiring device 14a includes a first adjusting device 140a, a first optical sensor 141a, and a first image processor 142a. The right eye lamp 11b includes a second light emitting device 12b and a second image acquiring device 14b. The second light emitting device 12b includes a second heat sink 120b, a second light emitting diode 121b, a second controller 122a, and a second reflective concave mirror 123b. The second image acquiring device 14b includes a second adjusting device 140b, a second optical sensor 141b, and a second image processor 142b.

The advanced driver assistance system 19 is respectively connected to the first controller 122a, the first adjusting device 140a, the first image processor 142a, the second controller 122b, the second adjusting device 140b, and the second image processor 142b by wire or wireless. The advanced driver assistance system 19 receives and processes the image information from the first image processor 142a and the second image processor 142b to obtain an analysis result, and sends commands to the first controller 122a, the first adjusting device 140a, the second controller 122b, and the second adjusting device 140b according to the analysis result. The advanced driver assistance system 19 can includes a judging module 190 and a controlling module 191 connected to the judging module 190. The judging module 190 judges whether there is a ramp or a curve in front of the vehicle body 10 according to the image information from the first image processor 142a and the second image processor 142b. The controlling module 191 sends different commands to the first controller 122a, the first adjusting device 140a, the second controller 122b and the second adjusting device 140b according to the judgement of the judging module 190.

When the autonomous intelligent vehicle 1 drives is closing to the bottom or top of the ramp, the lighting and imaging scope of the two eye lamps 11 become smaller and smaller. Thus, when the judgement of the judging module 190 is that the vehicle body 10 is closing to the bottom or top of the ramp, the controlling module 191 makes at least one of the first light emitting diode 121a, the first optical sensor 141a, the second light emitting diode 121b and the second optical sensor 141b turn up, turn down, or swing up and down so that the lighting and imaging scope of the two eye lamps 11 can be increased.

Figure 8:
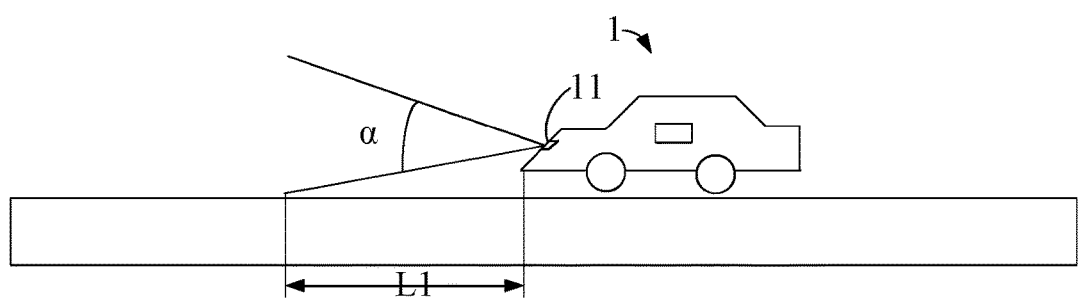
FIG. 8 is a side schematic diagram of the autonomous intelligent vehicle of FIG. 1 driving along a horizontal road.

As shown in FIG. 8, the original lighting angle or visual angle of the eye lamp 11 along the vertical direction is defined as a, the original distance between the nearest lighting or visual point on the road and the front of the vehicle body 10 of the eye lamp 11 along the horizontal direction is defined as L1.

Figure 9:
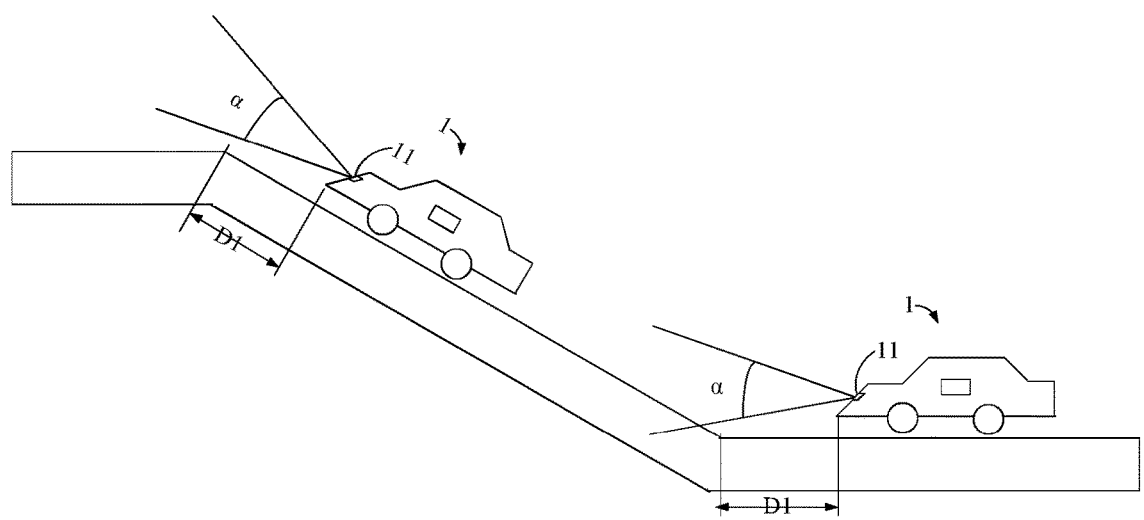
FIG. 9 is a side schematic diagram of the autonomous intelligent vehicle of FIG. 1 driving up the ramp.
Figure 10:
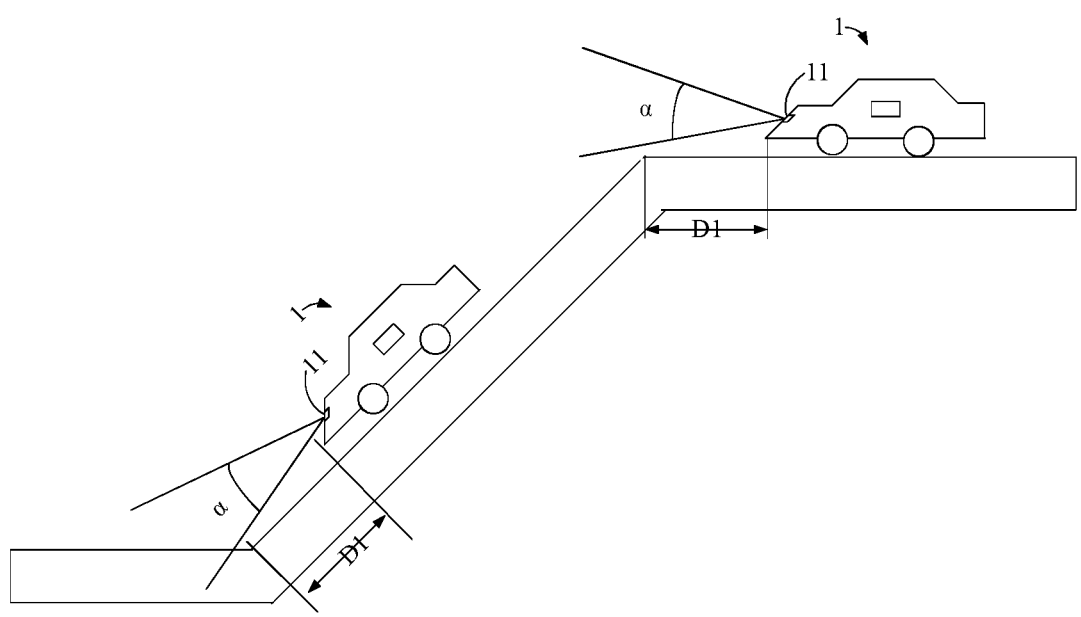
FIG. 10 is a side schematic diagram of the autonomous intelligent vehicle of FIG. 1 driving down the ramp.

As shown in FIGS. 9-10, when the judgement of the judging module 190 is that the vehicle body 10 is closing to an inflection point where the road is curved toward the autonomous intelligent vehicle 1, the command sent from the controlling module 191 is that the first light emitting diode 121a, the first optical sensor 141a, the second light emitting diode 121b and the second optical sensor 141b turn up gradually as the decrease of the distance D1 between the inflection point and the front of the autonomous intelligent vehicle 1. Vice versa, when the judgement of the judging module 190 is that the vehicle body 10 is closing to an inflection point where the road is curved away from the autonomous intelligent vehicle 1, the command sent from the controlling module 191 is that the first light emitting diode 121a, the first optical sensor 141a, the second light emitting diode 121b and the second optical sensor 141b turn down gradually as the decrease of the distance D1. The inflection point can be the bottom or top of the ramp, or a place where the declivity is changed. In one embodiment, when the judgement of the judging module 190 is that D1<L1 and the road is curved toward the autonomous intelligent vehicle 1, the command sent from the controlling module 191 is that all the first light emitting diode 121a, the first optical sensor 141a, the second light emitting diode 121b and the second optical sensor 141b turn up gradually as the decrease of the distance D1; and when the judgement of the judging module 190 is that D1<L1 and the road is curved away from the autonomous intelligent vehicle 1, the command sent from the controlling module 191 is that all the first light emitting diode 121a, the first optical sensor 141a, the second light emitting diode 121b and the second optical sensor 141b turn down gradually as the decrease of the distance D1.

Furthermore, when the judgement of the judging module 190 is that the autonomous intelligent vehicle 1 has passed by the inflection point, the command sent from the controlling module 191 is that all the first light emitting diode 121a, the first optical sensor 141a, the second light emitting diode 121b and the second optical sensor 141b turn back to original state.

When the autonomous intelligent vehicle 1 drives is closing to the curve of the road, the lighting and imaging scope of the two eye lamps 11 on the road also become smaller and smaller. Thus, when the judgement of the judging module 190 is that the vehicle body 10 is closing to the curve of the road, the controlling module 191 makes at least one of the first light emitting diode 121a, the first optical sensor 141a, the second light emitting diode 121b and the second optical sensor 141b turn left, turn right, or swing left and right so that the lighting and imaging scope of the two eye lamps 11 on the road can be increased.

Figure 11:
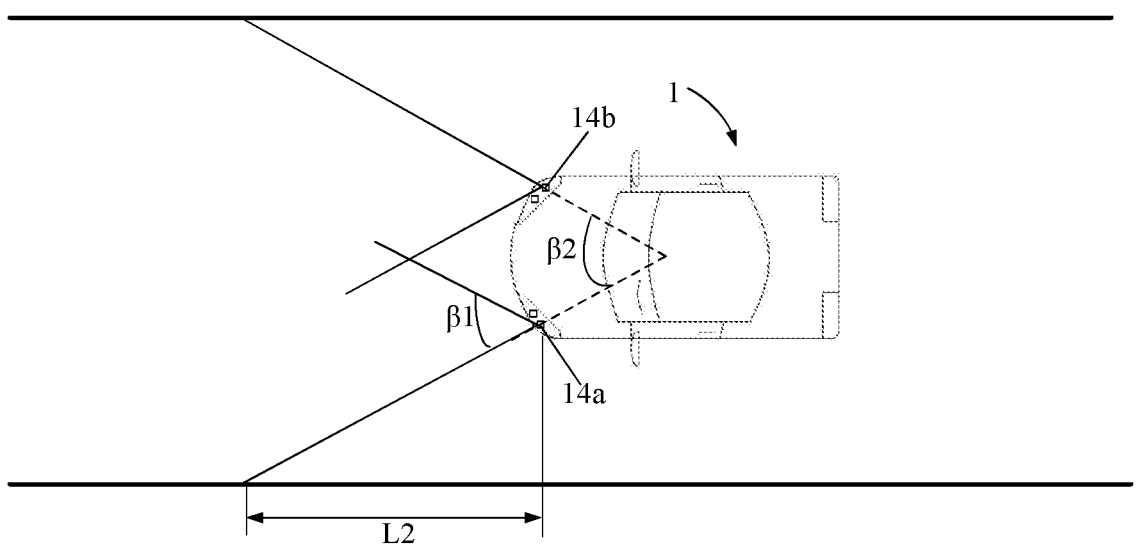
FIG. 11 is a top schematic diagram of the autonomous intelligent vehicle of FIG. 1 driving along a straightaway.

As shown in FIG. 11, the horizontal visual angle of the first optical sensor 141a and the horizontal visual angle of the second optical sensor 141b is the same and defined as $\beta 1$, the common horizontal visual angle of the first optical sensor 141a and the second optical sensor 141b is defined as $\beta 2$. The distance between the nearest visual point on the side of the road and the first image acquiring device 14a along the road extending direction, when the autonomous intelligent vehicle drives in the middle of the road, is defined as L2.

Figure 12:
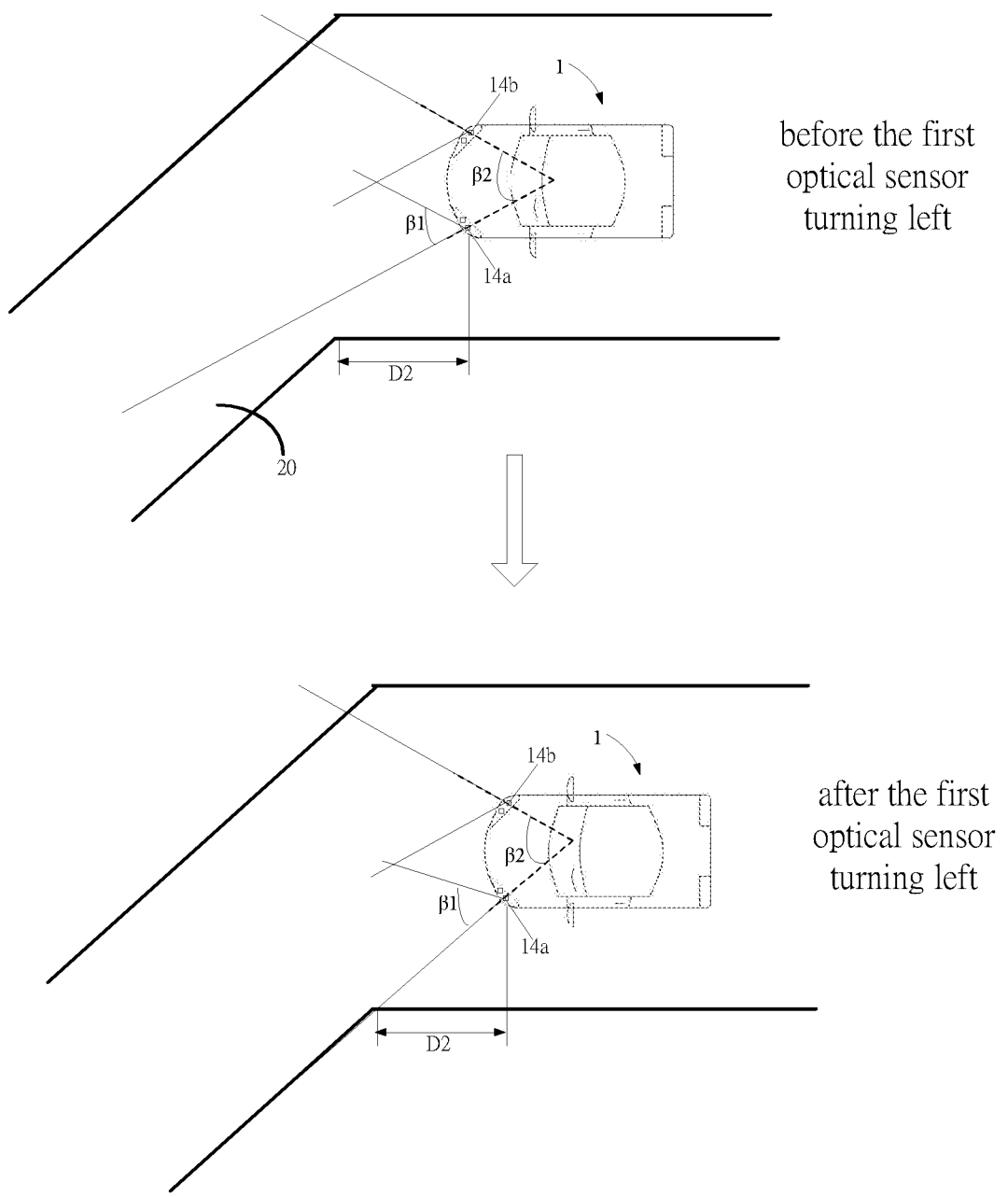
FIG. 12 is a top schematic diagram of the autonomous intelligent vehicle of FIG. 1 driving along a curve.

As shown in FIG. 12, when the judgement of the judging module 190 is that the vehicle body 10 is closing to an inflection point where the road is curved left, the command sent from the controlling module 191 is that the first optical sensor 141a turn left gradually as the decrease of the distance D2 between the inflection point and the front of the autonomous intelligent vehicle 1. Although the horizontal visual angle $\beta 1$ of the first optical sensor 141a and the horizontal visual angle $\beta 1$ of the second optical sensor 141b is unchanged, the common horizontal visual angle $\beta 2$ of the first optical sensor 141a and the second optical sensor 141b is increased. Vice versa, when the judgement of the judging module 190 is that the vehicle body 10 is closing to an inflection point where the road is curved right, the command sent from the controlling module 191 is that the second optical sensor 141b turn right gradually as the decrease of the distance D2 between the inflection point and the front of the autonomous intelligent vehicle 1. In one embodiment, when the judgement of the judging module 190 is that the vehicle body 10 is closing to an inflection point where the road is curved left and D2<L2, the command sent from the controlling module 191 is that the first optical sensor 141a turn left gradually as the decrease of the distance D2; when the judgement of the judging module 190 is that the vehicle body 10 is closing to an inflection point where the road is curved right and D2<L2, the command sent from the controlling module 191 is that the second optical sensor 141b turn right gradually as the decrease of the distance D2.

As shown in FIG. 12, when the D2<L2, if the first optical sensor 141a does not turn left, a blind area 20 is formed and cannot be observed by the first optical sensor 141a near the curve. The blind area 20 can be eliminated by turning the first optical sensor 141a left. When the judgement of the judging module 190 is that the vehicle body 10 has passed by the curve, the first optical sensor 141a or the second optical sensor 141b turns back to original state.

The control method of the first optical sensor 141a and the second optical sensor 141b can also be applied to control the first light emitting diode 121a and the second light emitting diode 121b. Thus, the lighting scope of the eye lamps 11 of the autonomous intelligent vehicle 1 can be increased.

The two eye lamps 11 of the autonomous intelligent vehicle 1 can acquires images of the object in front of the vehicle body 10 at any time and observe the cars, motorcycles, bicycles, or pedestrians in static state or dynamic state.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An autonomous intelligent vehicle, comprising:
a vehicle body;
an advanced driver assistance system located on the vehicle body; and
two eye lamps located in a front of the vehicle body and spaced apart from each other, wherein each of the two eye lamps comprises a light emitting device and an image acquiring device spaced apart from the light emitting device; the light emitting device emits lights to light an object on a road and in front of the vehicle body, and the image acquiring device acquires an image of the object, processes the image to obtain an image information, and sends the image information to the advanced driver assistance system; wherein the two eye lamps comprises a left eye lamp and a right eye lamp; wherein the left eye lamp comprises a first light emitting device and a first image acquiring device; the first light emitting device comprises a first heat sink, a first light emitting diode, a first controller, and a first reflective concave mirror; and the first image acquiring device comprises a first adjusting device, a first optical sensor, and a first image processor; wherein the right eye lamp comprises a second light emitting device and a second image acquiring device; the second light emitting device comprises a second heat sink, a second light emitting diode, a second controller, and a second reflective concave mirror; and the second image acquiring device comprises a second adjusting device, a second optical sensor, and a second image processor; and
wherein the advanced driver assistance system is respectively connected to the first controller, the first adjusting device, the first image processor, the second controller, the second adjusting device, and the second image processor.

2. The autonomous intelligent vehicle as claimed in claim 1, wherein the light emitting device comprises a heat sink, a light emitting diode, and a reflective concave mirror.

3. The autonomous intelligent vehicle as claimed in claim 2, wherein the reflective concave mirror defines a through hole at the bottom, the heat sink covers the through hole, and the light emitting diode is in direct contact with the heat sink by passing through the through hole.

4. The autonomous intelligent vehicle as claimed in claim 2, wherein the light emitting device further comprises a controller connected to the heat sink and the light emitting diode, the controller controls the light emitting diode and adjusts an emitting light angle of the light emitting diode.

5. The autonomous intelligent vehicle as claimed in claim 4, wherein the light emitting device emits a visible light in day for imaging and an infrared light in night for imaging.

6. The autonomous intelligent vehicle as claimed in claim 5, wherein the light emitting device further emits a later for detecting distance.

7. The autonomous intelligent vehicle as claimed in claim 4, wherein the light emitting device emits lights with a central wavelength of 850 nanometers, 870 nanometers, 890 nanometers, 905 nanometers, or 940 nanometers.

8. The autonomous intelligent vehicle as claimed in claim 1, wherein the image acquiring device comprises an optical sensor and an image processor connected to the optical sensor.

9. The autonomous intelligent vehicle as claimed in claim 8, wherein the optical sensor is a charge-coupled device camera, an infrared complementary metal oxide semiconductor laser displacement sensor, a color complementary metal oxide semiconductor laser displacement sensor, or any combination thereof.

10. The autonomous intelligent vehicle as claimed in claim 8, wherein the image acquiring device further comprises an adjusting device, the optical sensor is fixed on the adjusting device, the adjusting device adjusts an visual angle of the optical sensor.

11. The autonomous intelligent vehicle as claimed in claim 8, wherein the two eye lamps share the same one image processor.

12. The autonomous intelligent vehicle as claimed in claim 1, wherein the advanced driver assistance system comprises a judging module and a controlling module connected to the judging module; the judging module judges whether there is a ramp or a curve in front of the vehicle body according to the image information from the first image processor and the second image processor; and the controlling module sends a command to the first controller, the first adjusting device, the second controller and the second adjusting device according to a judgement of the judging module.

13. The autonomous intelligent vehicle as claimed in claim 12, wherein when the judgement of the judging module is that the vehicle body is closing to a first inflection point of the ramp where the road is curved toward the vehicle body, the command sent from the controlling module is that the first light emitting diode, the first optical sensor, the second light emitting diode and the second optical sensor turn up gradually as a decrease of a first distance D1 between the first inflection point and the front of the vehicle body; when the judgement of the judging module is that the vehicle body is closing to a second inflection point of the ramp where the road is curved away from the vehicle body, the command sent from the controlling module is that the first light emitting diode, the first optical sensor, the second light emitting diode and the second optical sensor turn down gradually as a decrease of a second distance D1' between the second inflection point and the front of the vehicle body.

14. The autonomous intelligent vehicle as claimed in claim 13, wherein a distance between the nearest lighting point or visual point on the road and the front of the vehicle body along the horizontal direction is defined as L1; when the judgement of the judging module is that the vehicle body is closing to the first inflection point and D1<L1, the command sent from the controlling module is that the first light emitting diode, the first optical sensor, the second light emitting diode and the second optical sensor turn up gradually as the decrease of the distance D1; and when the judgement of the judging module is that the vehicle body is closing to the second inflection point and D1'<L1, the command sent from the controlling module is that the first light emitting diode, the first optical sensor, the second light emitting diode and the second optical sensor turn down gradually as the decrease of the distance D1'.

15. The autonomous intelligent vehicle as claimed in claim 14, wherein when the judgement of the judging module is that the vehicle body has passed by the first inflection point or the second inflection point, the command sent from the controlling module is that the first light emitting diode, the first optical sensor, the second light emitting diode and the second optical sensor turn back to original state.

16. The autonomous intelligent vehicle as claimed in claim 12, wherein when the judgement of the judging module is that the vehicle body is closing to a first inflection point of the curve where the road is curved left, the command sent from the controlling module is that the first optical sensor and the first light emitting diode turn left gradually as a decrease of a distance D2 between the first inflection point and the front of the vehicle body; and when the judgement of the judging module is that the vehicle body is closing to a second inflection point of the curve where the road is curved right, the command sent from the controlling module is that the second optical sensor and the second light emitting diode turn right gradually as a decrease of a distance D2' between the second inflection point and the front of the vehicle body.

17. The autonomous intelligent vehicle as claimed in claim 16, wherein a distance between the nearest visual point on the side of the road and the first image acquiring device along a road extending direction, when the vehicle body drives in the middle of the road, is defined as L2; when the judgement of the judging module is that the vehicle body is closing to the first inflection point and D2<L2, the command sent from the controlling module is that the first optical sensor and the first light emitting diode turn left gradually as the decrease of the distance D2; when the judgement of the judging module is that the vehicle body is closing to a second inflection point and D2<L2, the command sent from the controlling module is that the second optical sensor and the second light emitting diode turn right gradually as the decrease of the distance D2.

18. The autonomous intelligent vehicle as claimed in claim 17, wherein when the judgement of the judging module is that the vehicle body has passed by the first inflection point, the command sent from the controlling module is that the first light emitting diode and the first optical sensor turn back to original state; when the judgement of the judging module is that the vehicle body has passed by the second inflection point, the command sent from the controlling module is that the second light emitting diode and the second optical sensor turn back to original state.

19. An autonomous intelligent vehicle, comprising:
a vehicle body;
an advanced driver assistance system located on the vehicle body; and
two eye lamps located in a front of the vehicle body and spaced apart from each other, wherein each of the two eye lamps comprises a light emitting device and an image acquiring device spaced apart from the light emitting device; the light emitting device emits lights to light an object on a road and in front of the vehicle body, and the image acquiring device acquires an image of the object, processes the image to obtain an image information, and sends the image information to the advanced driver assistance system; and when the advanced driver assistance system determines that there is a ramp in front of the vehicle body according to the image information from the image acquiring device, the advanced driver assistance system controls the light emitting device and the image acquiring device to turn up or down.

20. An autonomous intelligent vehicle, comprising:
a vehicle body;
an advanced driver assistance system located on the vehicle body; and
two eye lamps located in a front of the vehicle body and spaced apart from each other, wherein each of the two eye lamps comprises a light emitting device and an image acquiring device spaced apart from the light emitting device; the light emitting device emits lights to light an object on a road and in front of the vehicle body, and the image acquiring device acquires an image of the object, processes the image to obtain an image information, and sends the image information to the advanced driver assistance system; and when the advanced driver assistance system determines that there is a curve in front of the vehicle body according to the image information from the image acquiring device, the advanced driver assistance system controls the light emitting device and the image acquiring device to turn left up or right.

\* \* \* \* \*